April 21, 1925.

W. B. BUTLER

MOLD FOR POTTERY WORK

Filed Feb. 9, 1924   3 Sheets-Sheet 1

1,534,155

Inventor
William B Butler
By W. W. Williamson
Atty.

April 21, 1925.
W. B. BUTLER
MOLD FOR POTTERY WORK
Filed Feb. 9, 1924
1,534,155
3 Sheets-Sheet 2
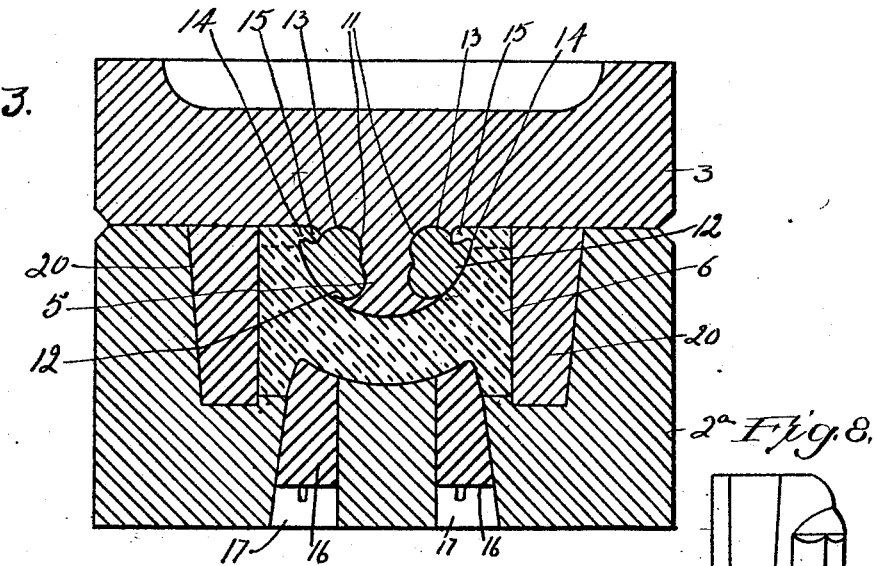
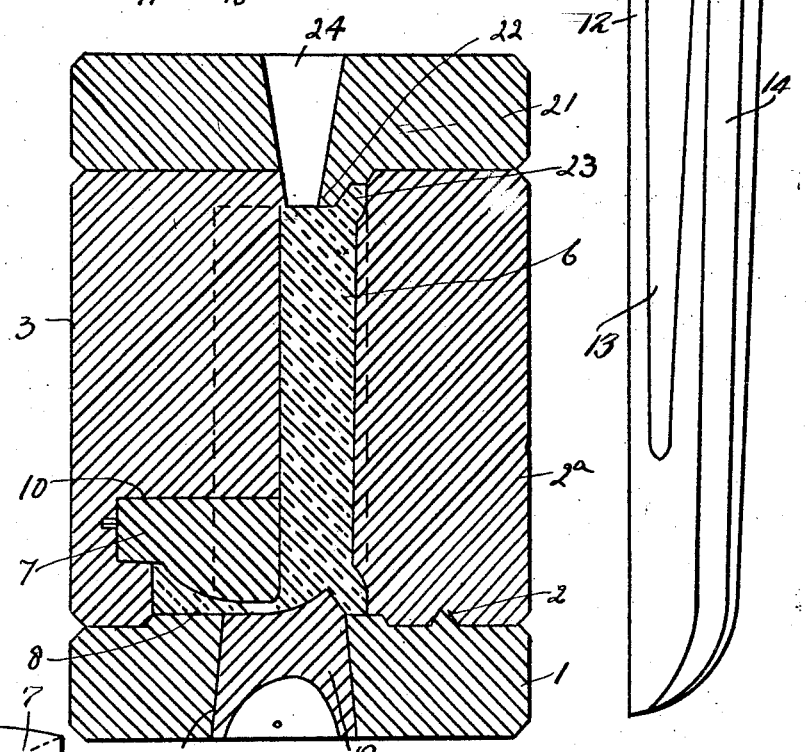
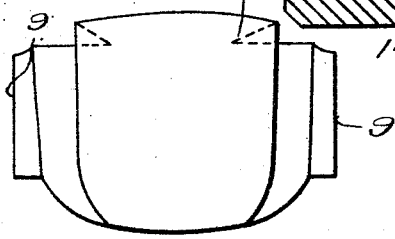
Inventor
William B. Butler
By W. B. Williamson
Atty.

April 21, 1925.  W. B. BUTLER  1,534,155
MOLD FOR POTTERY WORK
Filed Feb. 9, 1924  3 Sheets-Sheet 3
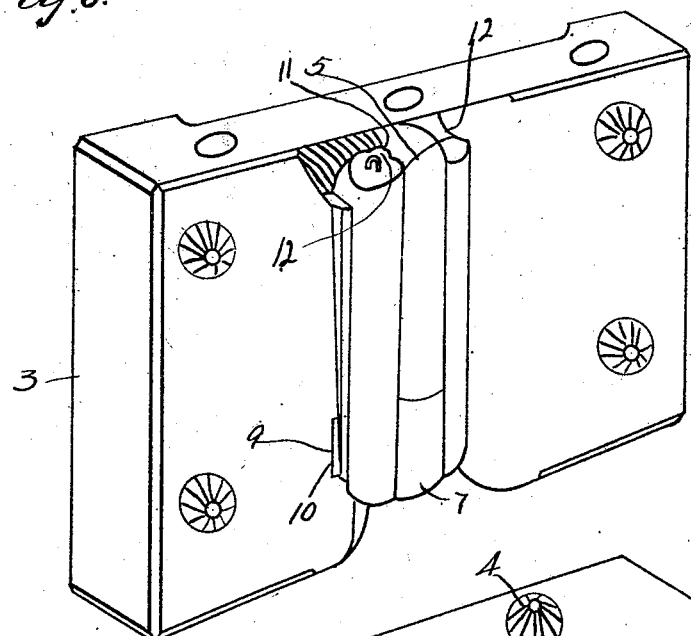
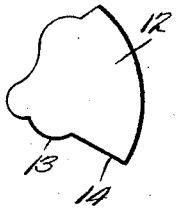
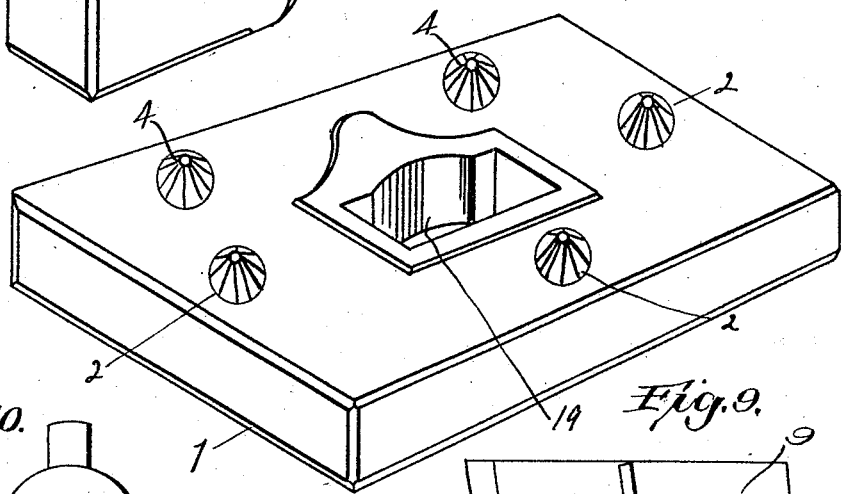
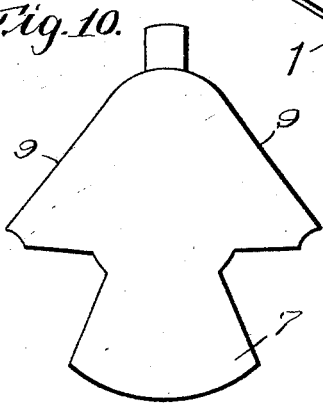
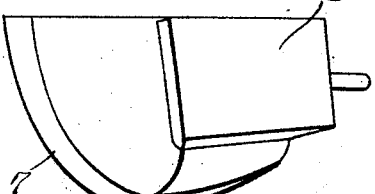
Inventor
William B. Butler
By W. W. Williamson Patented Apr. 21, 1925.

1,534,155

UNITED STATES PATENT OFFICE.

WILLIAM BERNARD BUTLER, OF TRENTON, NEW JERSEY.

MOLD FOR POTTERY WORK.

Application filed February 9, 1924. Serial No. 691,589.

*To all whom it may concern:*

Be it known that I, WILLIAM B. BUTLER, a citizen of the United States, residing at Trenton, in the county of Mercer and State of New Jersey, have invented new and useful Improvements in Molds for Pottery Work, of which the following is a specification.

My invention relates to a new and useful improvement in molds for pottery work, and especially for that class of such molds intended to produce cabinet urinals and has for its object to so construct such a mold as to provide for the removal of certain parts thereof during the air drying of the plastic material of which the article is being made so as to prevent the cracking of said article from shrinkage.

A further object of this invention is to provide for the simple and effective assembling or setting up of the mold.

With these and other objects in view, this invention consists in the details of construction and combination of elements hereinafter set forth and then specifically designated by the claims.

In order that those skilled in the art to which this invention appertains, may understand how to make and use the same, I will describe its construction in detail referring by numerals to the accompanying drawings forming a part of this application, in which:—

Fig. 3, is a section at the line 3—3 of Fig. 2.

Fig. 4, is a section at the line 4—4 of Fig. 1.

Fig. 5, is a perspective of the front section or face of the molds.

Fig. 6, is a similar view of the base section.

Fig. 7, is a detail plan view of one of the spline plugs.

Fig. 8, is a side elevation of Fig. 7.

Fig. 9, is a side view of the insert for the front section of the mold.

Fig. 10, is a plan view of Fig. 9.

Fig. 11, is a front view of Fig. 9.

Figure 1:
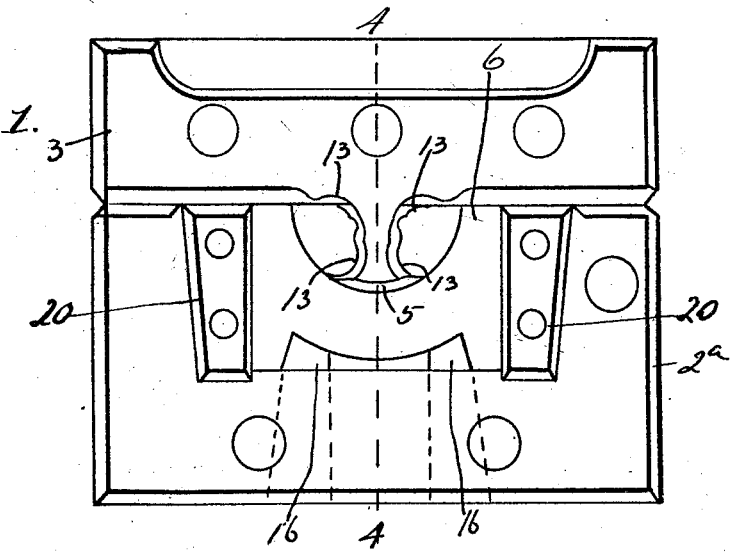
Fig. 1, is a plan view of the assembled mold showing a urinal formed therein.
Figure 2:
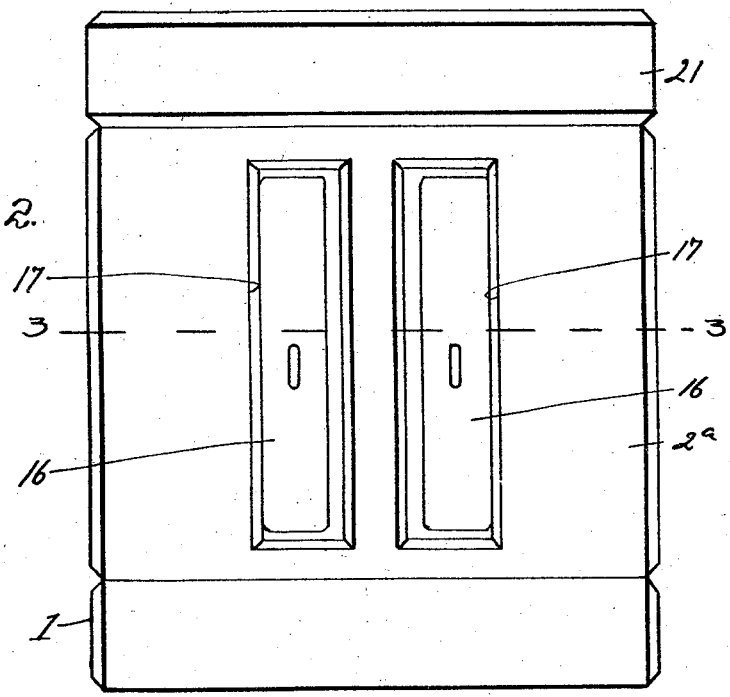
Fig. 2, is a rear view of Fig. 1.

In carrying out my invention as here embodied, 1 represents the base of a mold for producing cabinet urinals and is provided with dowels 2 so that when the body or main member 2ª is set upon this base in assembling the mold it will be properly aligned by these dowels entering corresponding dowel recesses formed in the bottom of the body member, as shown in Fig. 4.

3 represents the front section or face of the mold also adapted to set upon the base and be aligned thereon by the dowels 4 and this front section has formed therewith the offset 5, the outer curved surface of which latter is of a contour corresponding to the inner surface of the urinal 6.

The lower portion of the offset 5 consists of an insert 7, the lower surface of which is intended to form the pan or basin 8 of the urinal, and this insert has formed therewith the wings 9 intended to fit within the recess 10 in the front section 3 in such manner that the insert will not interfere with the removal of the front section from the freshly formed urinal.

The offset 5 has an undercut groove 11 on each side thereof, each of said grooves being of such shape as to receive one of the spline plugs 12 and hold the same in place when said plugs are slid downward into said grooves. Each of these plugs is tapered and also have formed therewith the tapered splines 13 to fit within the corresponding contour of the groove 11, thus holding the plugs against displacement from said grooves except by upward withdrawal therefrom, as will be readily understood.

The outer surfaces of the plugs in conjunction with the curved surface of the offset 5 complete that portion of the mold intended to form the inner curved portion of the urinal. The spline plugs 12 also have formed therewith the lips 14 which in conjuction with the front section 3 form the flanges 15 of the urinal 6 as clearly shown in Fig. 3.

The back of the urinal is formed by the inner surface of the back portion of the body section 2ª in conjunction with the inner surface of the inserts 16, and these inserts are positioned by being placed in the slots 17 which are formed in said body section.

For the production of the bottom of the urinal an insert 18 is set within the opening 19 formed in the base 1, while the side walls of the urinal are formed against the inner surfaces of the insert slabs 20 set in the body of the mold, as shown in Fig. 3.

21 represents the top section of the mold and is adapted to set upon the top of the body and the front sections when the mold is assembled, and is provided with the downwardly extending boss 22 for producing the flange 23 of the urinal, said flange serving the purpose of positioning the top of the finished urinal to which latter said top is pasted prior to burning the completed article.

Through the top section 21 is formed a flared hole 24 through which the raw material is poured into the interior of the assembled mold to form the article being manufactured. Heretofore great difficulty and considerable loss has been attendant upon the manufacture of certain articles in vitreous ware when the raw material used is of such consistency as to be poured into the mold on account of the large degree of shrinkage and this has especially been the case in the manufacture of urinals; but these disadvantages are entirely overcome by my improved mold and method of handling the same, which is as follows:—The mold having been assembled as before described and the raw material poured therein to form the article, a certain time is allowed for the partial drying and setting of the raw material article when the top 21 is removed and the spline plugs 12 withdrawn, thereby ample space for contraction of the article at the point of greatest contraction, namely, between the flanges 15. Next the front section 3 is removed and the insert 7 lifted out of the basin of the urinal after which the inserts 16 are withdrawn from the back of the body 2ª and the insert 18 from the base. This will be entirely free to contact through its dimension without any restriction or resistance thereto and when sufficiently dry for transfer to the kiln, the slabs 20 are removed giving free access to the article for final removal from the mold.

Of course I do not wish to be limited to the exact details of construction as herein shown as these may be varied within the limits of the appended claims without departing from the spirit of my invention.

Having thus fully described my invention, what I claim as new and useful is:—

1. A mold for producing articles of the character described, consisting of a base, a body and a front section, said front section having an offset, and spline plugs removably set in said offset.

2. A mold for producing articles from highly shrinkable material, consisting of a base, a body, a face and a top section, so assembled as to be readily disassembled, an insert removably set in the base for forming a portion of the base of the article to be molded, two inserts removably set in the body for giving contour to the back of said article, an offset carried by the face section, two spline plugs removably fitted to said offset, said plugs and offset constituting that portion of the mold for forming the undercut inside of said article and an insert forming a portion of said offset.

3. In a mold of the character described, a front section, an offset formed with said section, an insert removably set in said section and forming a continuation of the offset and two spline plugs removably fitted in said offset and insert, said offset, insert and plugs adapted to form the undercut interior of an urinal when raw material is introduced within the mold.

In testimony whereof I have hereunto affixed my signature.

WILLIAM BERNARD BUTLER.